United States Patent
Yost

(10) Patent No.: US 6,684,061 B1
(45) Date of Patent: Jan. 27, 2004

(54) SYSTEMS AND METHODS FOR MEASURING INTERFERENCE RECIPROCITY BETWEEN UPLINK AND DOWNLINK DIRECTIONS IN A WIRELESS COMMUNICATIONS SYSTEM

(75) Inventor: George P. Yost, DeSoto, TX (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 508 days.

(21) Appl. No.: 09/619,950

(22) Filed: Jul. 20, 2000

(51) Int. Cl.[7] ............................................. H04B 17/00
(52) U.S. Cl. ........................ 455/67.1; 455/63; 455/65; 455/423
(58) Field of Search ........................... 455/63, 65, 67.1, 455/423, 424, 425

(56) References Cited

U.S. PATENT DOCUMENTS

| | | | | |
|---|---|---|---|---|
| 5,603,092 A | * | 2/1997 | Stjernholm | 455/63 |
| 5,603,093 A | * | 2/1997 | Yoshimi et al. | 455/63 |
| 5,799,243 A | * | 8/1998 | Ojaniemi | 455/63 |
| 5,832,368 A | * | 11/1998 | Nakano et al. | 455/63 |
| 6,223,031 B1 | * | 4/2001 | Naslund | 455/423 |
| 6,240,275 B1 | * | 5/2001 | H'Mimy et al. | 455/62 |
| 6,332,076 B1 | * | 12/2001 | Shah et al. | 455/423 |

FOREIGN PATENT DOCUMENTS

| | | |
|---|---|---|
| EP | 0 720 407 A | 7/1996 |
| WO | WO 98 53630 A | 11/1998 |
| WO | WO 00 01182 A | 1/2000 |

* cited by examiner

*Primary Examiner*—William Trost
*Assistant Examiner*—Stephen D'Agosta

(57) ABSTRACT

Methods and systems for measuring interference reciprocity between uplink and downlink directions in a wireless communications system. Correlation data between uplink and downlink interference, e.g., bit error rate, during transmissions between wireless terminals 104 and base stations 102 is measured. The correlation data is analyzed 106/107/111 to determine if uplink and downlink reciprocity falls within a predetermined range. Adjustment criteria may be determined when reciprocity falls outside a predetermined range. Measurement may be automated 104/102/101 for near real-time results. Systems include means for measuring correlation between uplink and downlink interferences during communication between a wireless terminal and a wireless base station controller 102; and a computer 107/111 for analyzing the correlation.

Figure 1:
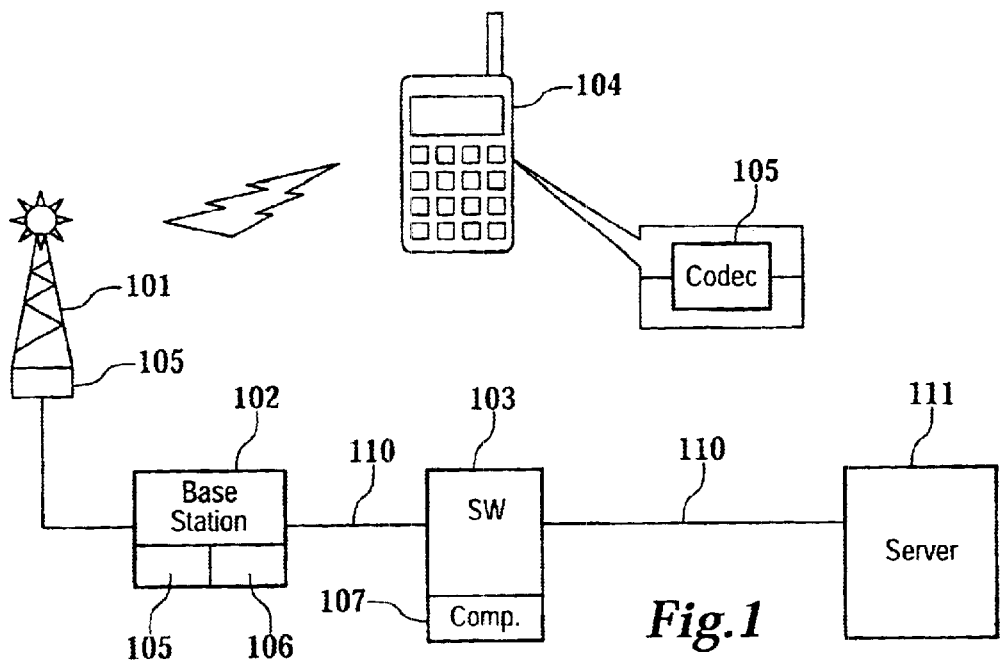

14 Claims, 1 Drawing Sheet even though the UL interference signal is relatively weak it may be picked up by a sensitive (high gain) base station antenna in a cell that is not the serving cell. Conversely, although a DL interference source is relatively powerful, in order to cause problems it has to be picked up by the insensitive antennas in wireless mobile systems. Thus, either type of interface could be a problem in such systems; but it is often true that UL and DL interference comes from different cells experiencing different levels of disturbance. Other differences, such as different directionality of the signals and different geographical distribution of the sources, may also change this equation. Furthermore, interference may be caused by non-cellular radio sources. In this case there may be no matching UL and DL frequencies and the interferences may be wildly divergent.

SYSTEMS AND METHODS FOR MEASURING INTERFERENCE RECIPROCITY BETWEEN UPLINK AND DOWNLINK DIRECTIONS IN A WIRELESS COMMUNICATIONS SYSTEM

FIELD OF THE INVENTION

The present invention is generally related to telecommunications and, more particularly, to methods and systems for improving reciprocal communications in wireless telecommunication systems.

BACKGROUND

Interference in a wireless communications system can arise from a number of sources. In a cellular system, if the interference comes from another cell with the same uplink (UL-from the mobile station to the base station) and downlink (DL-the opposite direction) frequencies, then it is generally true that the UL interference is similar to that in the DL direction in the same cell—this is called reciprocity. This phenomenon, however, may not always be true because UL interference generally comes from mobile transmitters broadcasting relatively weak omnidirectional signals from a number of locations within a coverage area of another cell, while the DL interference generally comes from a single, relatively powerful base station antenna that is often directional.

In wireless cells, the difference in signal strength between base station (BS) and mobile station (MS) transmitters is generally compensated by an equivalent difference in antenna sensitivity. Thus, even though the UL interference signal is relatively weak it may be picked up by a sensitive (high gain) base station antenna in a cell that is not the serving cell. Conversely, although a DL interference source is relatively powerful, in order to cause problems it has to be picked up by the insensitive antennas in wireless mobile systems. Thus, either type of interface could be a problem in such systems; but it is often true that UL and DL interference comes from different cells experiencing different levels of disturbance. Other differences, such as different directionality of the signals and different geographical distribution of the sources, may also change this equation. Furthermore, interference may be caused by non-cellular radio sources. In this case there may be no matching UL and DL frequencies and the interferences may be wildly divergent.

In many wireless communication systems it is difficult to measure and analyze the interfering signal itself in either direction. Typically the UL interference is much easier to measure because the base station antenna can be connected to sophisticated measuring devices, computing devices, and memory devices. This may not be the case for the mobile station, which, apart from the difficulty in collecting measurements, must generally transmit any measurements it makes back to the base station over the same link as the voice or data transmission. Any such use of the transmission channel decreases the rate at which voice or data information can be transmitted.

It would therefore be desirable in the wireless telecommunications art to improve the measurement of signal reciprocity, thus allowing network engineers to efficiently determine how to concentrate their efforts towards system maintenance and improvements.

SUMMARY OF THE INVENTION

The problem of interference has been addressed in the past via visual inspection of available measurement data and vague, "rule of thumbo value judgements. The shortcoming of visual inspections is that such methods are not objective and do not allow for the ability to automate detection of problems or production of alarms or reports. There is apparently an absence of applied mathematical methods or systems that use available wireless communication system measurements to compare UL and DL interference in order to facilitate a solution to wireless system interference. If such techniques were to exist, they could be used for analyzing the performance of a wireless network in an objective and automatic way.

The shortcomings of the prior art are met with the present invention wherein statistical measurements of correlation and relative ranges between uplink (UL) and downlink (DL) interferences are obtained—making it possible to render improved reciprocal communication in wireless systems. An aspect of the invention provides for several simultaneous measurements of Bit Error Rate (BER), BER class, or other measure of interference that are compared for UL and DL. In the prior art, the comparison may be visual whereby a computer-generated plot is examined by trained personnel. The plot is made over a range of traffic conditions from low to high. For example, if the interference comes from another cell, then it should vary with the traffic. A range of traffic conditions therefore may result in a range of interference conditions. With the present invention, the DL and the UL interferences may also be automatically correlated and analyzed by a computer using published statistical techniques well known and well accepted in the statistical arts, and signal adjustments/corrections may be based on the computer§s analysis.

In addition to measuring the correlation, the system and methods of the present invention can determine the spread of values, e.g., as standard deviations. If statistics of the same type (e.g., UL and DL BERs) are being compared, a conclusion can be drawn from any statistically significant difference in the sizes of the spread. The same would apply measures of spread to other than standard deviation, such as the 90% quantile, etc. If non-corresponding types of data are being compared, such as the UL interfering signal strength and the DL BER, then one can compare the results of a number of cells and see if the ranges compare in the same ways. For example, if in one cell the ratio of interference signal strength to BER differs in statistically significant ways from that in most other cells, this could be an indication of a transmission/receive problem in that cell.

DETAILED DESCRIPTION OF PREFERRED EMBODIMENTS

The present invention uses measurements of correlation and relative ranges between UL and DL interference. The invention provides systems and methods for analyzing interference via measurement and analysis of UL-DL reciprocity.

Referring to FIG. 1, typical aspects of a wireless communication system generally include, among other things, cellular antennas 101, base station/base station controller 102, switches 103, communications standards (e.g., TDMA, CDMA, GSM, etc., not shown) and mobile terminals/units 104 carried by system users. For example, during digital transmission in the TDMA technology every time interval is broken up into three portions, wherein up to three phone calls may occur simultaneously on the same frequency (sharing the frequency). These ⅓rd periods are called time slots. The human voice is reduced to its essentials and coded into a fraction of the time that it actually took to speak. The converted voice signal is then transmitted in a fraction of the time period over which it was spoken over telecommunication systems, received and converted back into voice. After reconstruction, one is generally able to listen to a voice signal where there are no gaps and errors due to interference or other problems have been reduced to a minimum.

The detection and correction of bit errors would generally occur in a coder/decoder (codec) 105 of the mobile terminal 104 for DL reception and in the switch 103 or base station 102 for UL recognition. Thus, during system operation, a computer 107 recognizes and understands the coding algorithm that is being used when it receives a signal. It decodes all the bits and tries to convert them back into voice. The purpose of redundant bits is to enable the system to detect transmission system failures and correct the bit sequence. Therefore, two processes are generally going on: (1) the detection of errors and (2) correction of as many errors possible.

Signal measurement in the wireless telecommunication system is ongoing during operation. The methods of this invention can be carried out in various parts of the telecommunication system. The typical mobile terminal and switch measure BERs during digital calls. The present invention goes beyond this by providing mathematical analysis capabilities. The mobile terminal and the switch will measure BER while a call is in progress. The mobile terminal measurements are intermingled with its voice or data transmissions and transmitted to the base station. These measurements may be collected by the base station for later analysis. The results can be stored in memory resources co-located with the base station, or can be transmitted to a computer system 107 co-located with the switch 103. Alternatively, data may be directed through the network 110 to a remote server 111 where the data is processed and analyzed.

Once the data is analyzed, a report may be generated for operator review. Engineers may recommend adjustments or corrections for the system (e.g., frequency allocation or power levels) in response to the analyzed data. Measurements may also be saved for long-term analysis or study, resulting in larger system adjustments or future system planning considerations.

Adjustments made to the system will depend on the technology and many other factors. If a problem exists in the cell, e.g., in accessibility, call retainability or integrity, adjustments to address the problem will depend on whether the DL is different from the UL. For example, more transmission power on UL or DL may allow the system to overwhelm noise or interference in that direction.

For the purpose of disclosure, it may be assumed that there is a simultaneous measurement that is related to the strength of the interference in both UL and DL directions. An explicit example is the measurement of Bit Error Rate (BER) in a digital system. This statistic is chosen because it is easily measured in both UL and DL directions and is commonly available in many systems. The BER is a count of the number of detected errors in the transmission of bits, the (0,1) units of information. These errors can be detected because of the encoding of the transmission, which causes redundant bits to be inserted into the bit stream. These redundant bits allow the detection of most types of errors, wherein a bit is incorrectly received. The encoding may allow bit errors to be corrected, although this can only be done if the error rate is not too large.

The BER provides a measure of the effect of interference because interference will cause bit errors to occur. Although high BER can also occur from other causes (e.g., poor signal strength), other causes can usually be detected from other measurements (e.g., signal strength while a call is in progress). With the methods of the present invention, the system is restricted to the common case in which high BER is primarily due to interference. Also explicitly included as measures of interference are functions of the BER, including the commonly used bit error classes wherein the full range of bit errors is classified into a small set of classes. Typically BER is measured as an average of a number of measurements made over a period of time, such as one hour. Explicitly included are other measure of the typical BER over a period of time, including quantities such as, for example, the 90% quantile, the value such that 90% of the detailed measurements over the time period lie below that value and 10% lie above that value, etc.

Also explicitly included are other measures of UL and DL interference, including direct measurements of interfering signal strength where available and any other measurements that can be performed on UL and DL interference simultaneously so that they may be compared. It is not necessary that these measures be of the same type. For example, one could measure the UL interference signal strength and the BER on DL, provided it is done over the same time periods and for the same channels.

Figure 2:
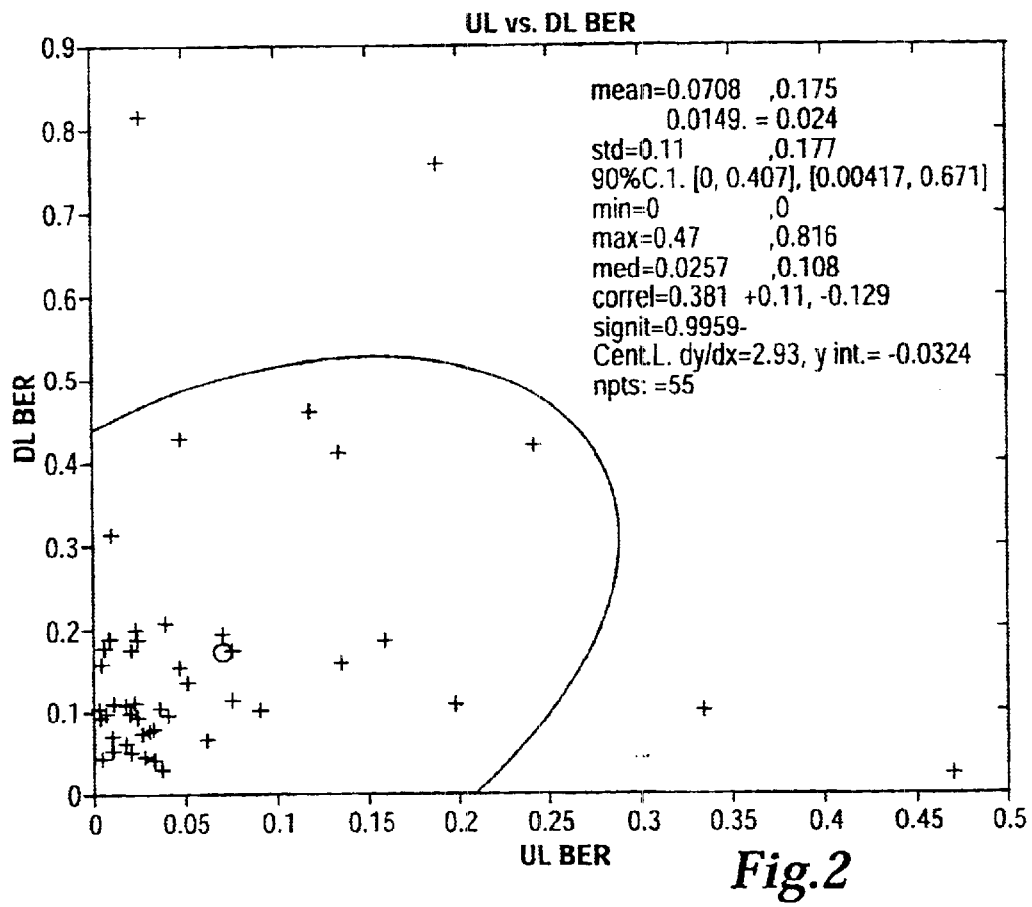

The key aspect of the invention is that simultaneous measurements of BER, BER class, and/or other measures of interference are compared for UL and DL. If the comparison is visual as in current practice, a plot such as shown in FIG. 2 may be examined by a trained technician or engineer. This plot can be made over a range of traffic conditions from low to high. If the interference comes from a nearby cell, then it should vary with the traffic in that cell. Therefore a range of traffic conditions will result in a range of interference conditions, but low UL BER will tend to occur at the same times as low DL BER, and similarly for high BERs. If the DL and the UL interferences are correlated in this way, that correlation may also be demonstrated in a plot such as shown in FIG. 2. Reciprocity implies that high UL interference occurs on average simultaneously with high DL interference, and correspondingly at low interference. The correlation may therefore take the form of a relatively narrow band of data points from low to high interference.

Because there are many other factors that affect BER, the correlation will not be perfect and mathematical techniques are needed to average over the randomizing effects of these other factors and measure the correlation and its statistical error. In addition to measuring the correlation, the individual range of values in the statistical sense of, for example, one standard deviation can be measured. If we are comparing statistics of the same type, as for example, UL and DL BERs, then conclusions may be drawn from any statistically significant difference in the sizes of the standard deviations. The same would apply to other measures, such as the 90% quantile, etc. If non-corresponding types of data are being compared, such as the UL interfering signal strength compared with the DL BERs, then one can compare the results of a number of cells and see if the ranges compare in the same ways. For example, if in one cell the ratio of interference signal strength to BER differs in a statistically significant way from that in most other cells, this could be an indication of a problem in that cell.

A preferred embodiment of the present invention includes the use of mathematical calculations as executed through software run on a computer. Through mathematical algorithms, correlation can be measured statistically.

A useful statistic for the estimation of correlation is given by the equation:

$$r_1 = \frac{\sum_i (x_i - \bar{x})(y_i - \bar{y})}{\left\{\left[\sum_i (x_i - \bar{x})^2\right]\left[\sum_i (y_i - \bar{y})^2\right]\right\}^{1/2}} \quad (1)$$

Here the correlated data is assumed to occur in (x, y) pairs, where $x_i$ may be the $i^{th}$ measurement of, for example, the UL interference and $y_i$ may be the $i^{th}$ measurement of the DL interference. Thus, the variable x might represent the UL BER and the variable y might represent the DL BER measured on the same channel and averaged over the same time period. The notations $\bar{x}$ and $\bar{y}$ represent the means values of x and y. The summations cover all time periods and all channels within a given cell that were measured for a given study. For BER, of course, the channels are restricted to digital channels. Also for BER, the measurements are only meaningful while a call is up on the channel; so the measurement times must generally be restricted to times during which one or more calls were in progress.

The correlation coefficient $r_1$ will lie between −1 and +1. A value near −1 would mean that an anti-correlation has been observed, completely contrary to reciprocity. In that case increasing UL BER corresponds to decreasing DL BER, a situation that surely would require system investigation and/or adjustment. Values of $r_1$ near +1 would mean that strong reciprocity has been observed. Normally, because of numerous randomizing factors almost always present, an engineer skilled in the art would recognize that values close to +1 are unlikely. Therefore, a smaller threshold would be accepted as indicative of reciprocity. One would normally take statistical errors into account, as will be discussed below. Values near 0 would mean that there is little relationship between UL and DL interference, and no reciprocity has been observed. This situation might also warrant investigation and correction.

It is familiar from the statistical literature that $r_1$ calculated from Eq. (1) may show a slight bias. A correction for this bias is sometimes used, given by:

$$r = r_1\left[1 + \frac{1 - r_1^2}{2(m-4)}\right], \quad (2)$$

where m is the number of terms in the sums of Eq(1). Regardless of whether Eq. (1) alone or Eq. (1) as corrected in Eq. (2) is used, this correlation coefficient provides a measure of the degree to which reciprocity is satisfied.

Other mathematical measures of correlation are generally known and available in the statistical literature and are inherently included in the scope of this invention. This invention can include any mathematical measure of correlation that may be known in the art and can be written into an executable computer program for use within a wireless communication system.

In order to draw meaningful conclusions from a measurement of correlation, it is usually necessary to understand the random statistical errors in r or $r_1$. These are often measured by use of Fisher's z, defined by:

$$z \equiv \tan h^{-1}(r) = \frac{1}{2}\log\left[\frac{1+r}{1-r}\right], \quad (3)$$

where the symbol $\tan_h^{-1}$ is the mathematical symbol for the inverse hyperbolic tangent function. If desired, one could substitute $r_1$ of Eq. (1) for r in Eq. (3) and what follows Fisher's z is a transformation of r that provides a statistic that is approximately unbiased with standard deviation approximately, $$\sigma_z = \sqrt{Var(z)} = \left[\frac{1}{m-4}\right]. \quad (4)$$

Again, m is the number of data points. Of course this must then be transformed back into a standard deviation in r:

$$\sigma_r^+ = \{\exp[2(z+\sigma_z)]-1\}/\{\exp[2(z+\sigma_z)]+1\}-r \quad (5)$$

$$\sigma_r^- = r-\{\exp[2(z-\sigma_z)]-1\}/\{\exp[2(z-\sigma_z)]+1\}.$$

The meaning of Eq.(5) is that one standard deviation upward in r is different from one standard deviation downward. Other mathematical measures of the size of a standard deviation in r may also be found in the literature, are well known in the art, and are inherently included in this invention.

Referring to FIG. 2, the measured correlation is 0.381 with positive error 0.110 and negative error 0.129, may be calculated from these equations, including the bias correction Eq.(2).

Further measurement that may be obtained from a wireless telecommunication system and used as a part of this invention is the relative range of the UL and DL interference values. For example, if BER is used as a measure of interference then one may measure the standard deviation for the BER on UL and DL. One may optionally adopt a different statistical measure of range such as the size of the shortest interval in which 90% of the data lie, or simply the 90% upper limit (i.e., that value such that 90% of the measured data points lie below and 10% like above). In order to determine statistical consistency, the errors in these measures must also be estimated. For example, an unbiased statistical estimator of the variance of a distribution where the mean must also be estimated is given by $$s^2 = \Sigma(x_i - \bar{x})^2/(m-1), \text{tm (6)}$$

where $x_1$ is the $i^{th}$ measurement of either UL or DL interference, $\bar{x}$ is again the sample mean value, and m is the total number of measurements. As mentioned before, the square root of $s^2$ is an estimator for the standard deviation—a measure of the range of the data. One may, using standard statistical techniques, compare standard deviations to see if they are consistent with being equal. In many cases one may find it is simpler and more direct to compare the measurements of $s^2$ rather than s.

This invention therefore includes statistical measurements of the UL and DL interference correlation, coupled with measurements of the error in the correlation. It also includes statistical measurements of the UL and DL ranges of values so that they might be compared.

Measurements may be used, for example, to flag cells within a cellular network in which reciprocity is violated—which may be an indication of the nature of the source of interference. Measurements may be used on an automatic basis to, for example, trigger an alarm or corrective action if the reciprocity undergoes a statistically significant change. That might indicate a change in the UL or DL interference without a corresponding change in the other direction. Such a change could occur, for example, by a realignment of the antenna of the interfering cell, or a change in the handoff hysteresis value for that cell (allowing mobile systems to wander farther from their serving base station).

What is claimed is:

1. A method for measuring interference reciprocity between uplink and downlink directions in a wireless communications system, comprising:

a) measuring correlation between uplink and downlink interference;

b) determining if reciprocity is violated by falling outside a predetermined correlation range for the interference, wherein said reciprocity is determined by the equation:

$$r_1 = \frac{\sum_1 (x_1 - \bar{x})(y_1 - \bar{y})}{\{[\sum_1 (x_1 - \bar{x})^2][\sum_1 (y_1 - \bar{y})^2]\}^{1/2}}$$

and wherein, the correlated data is assumed to occur in (x,y) pairs, where $X_1$ may be the $i^{th}$ measurement of the UL interference and $y_i$ may be the $i^{th}$ measurement of the DL interference and the notations $\bar{x}$ and $\bar{y}$ represent the means values of x and y;

wherein the summations cover all time periods and all channels within a given cell measured for a given determination; and c) identifying correlation status with regard to the range.

2. The method of claim 1 wherein interference being measured is bit error rate between uplink and downlink transmission.

3. The method of claim 2, further comprising:

providing corrective input to the wireless communication system based on a determination that reciprocity is being violated.

4. The method of claim 3 wherein the corrective input to the system is in the form of adjustments to the wireless communication system based on the correlation status.

5. The method of claim 4 wherein the adjustments are directed to the mobile terminal and/or the base station.

6. The method of claim 4 wherein the adjustments are directed to a system operator.

7. The method of claim 1 wherein the variable x may represent the UL bit error rate and the variable y may represent the DL bit error rate measured on the same channel and averaged over the same time period.

8. The method of claim 1, further comprising:

providing corrective input to the wireless communication system based on a determination that reciprocity is being violated.

9. The method of claim 8 wherein the corrective input to the system is in the form of adjustments to the wireless communication system based on the correlation status.

10. The method of claim 9 wherein the adjustments are directed to the mobile terminal and/or the base station.

11. The method of claim 9 wherein the adjustments are directed to a system operator.

12. A system for measuring interference reciprocity between uplink and downlink directions in a wireless telecommunications system, comprising:

means for measuring correlation between uplink and downlink interference during communication between a wireless terminal and a wireless base station; and a computer for analyzing the correlation and for providing corrective input to the wireless telecommunication system wherein said reciprocity is determined by the equation:

$$r_1 = \frac{\sum_1 (x_1 - \bar{x})(y_1 - \bar{y})}{\{[\sum_1 (x_1 - \bar{x})^2][\sum_1 (y_1 - \bar{y})^2]\}^{1/2}}$$

and wherein, the correlated data is assumed to occur in (x,y) pairs, where $x_i$ may be the $i^{th}$ measurement of the UL interference and $y_i$ may be the $i^{th}$ measurement of the DL interference and the notations $\bar{x}$ and $\bar{y}$ represent the means values of x and y;

wherein the summations cover all time periods and all channels within all channels within a given cell measured for a given determination.

13. The system of claim 12 further comprising means at the base station and/or mobile terminal for reacting to corrective input from the computer.

14. The system of claim 13 wherein the means for providing corrective input is a report generated for system maintenance and planning personnel.

* * * * *